(12) United States Patent
Iversen et al.

(10) Patent No.: US 12,502,422 B2
(45) Date of Patent: Dec. 23, 2025

(54) THERAPEUTIC mRNA VACCINE FOR MALIGNANCIES

(71) Applicant: ONCOCINE LLC, Lebanon, OR (US)

(72) Inventors: Patrick Iversen, Grand Junction, CO (US); Nickolas Kipshidze, New York, NY (US); Nodar Kipshidze, New York, NY (US)

(73) Assignee: Oncocine LLC, Lebanon, OR (US)

( * ) Notice: Subject to any disclaimer, the term of this patent is extended or adjusted under 35 U.S.C. 154(b) by 850 days.

(21) Appl. No.: 17/835,071

(22) Filed: Jun. 8, 2022

(65) Prior Publication Data

US 2022/0401538 A1    Dec. 22, 2022

Related U.S. Application Data

(60) Provisional application No. 63/208,581, filed on Jun. 9, 2021.

(51) Int. Cl.
*A61K 39/39* (2006.01)
*A61K 39/00* (2006.01)
*A61P 35/00* (2006.01)

(52) U.S. Cl.
CPC ...... *A61K 39/001144* (2018.08); *A61K 39/39* (2013.01); *A61P 35/00* (2018.01); *A61K 2039/53* (2013.01); *A61K 2039/55527* (2013.01)

(58) Field of Classification Search
None
See application file for complete search history.

(56) References Cited

U.S. PATENT DOCUMENTS

| | | |
|---|---|---|
| 2007/0249538 A1 | 10/2007 | Sazani et al. |
| 2016/0016900 A1 | 1/2016 | Kinsella et al. |
| 2020/0109121 A1 | 4/2020 | Miao et al. |
| 2020/0149026 A1 | 5/2020 | Horscroft et al. |
| 2024/0050542 A1 | 2/2024 | Iversen et al. |

FOREIGN PATENT DOCUMENTS

| | | |
|---|---|---|
| WO | 2007058894 A2 | 5/2007 |
| WO | 2023244957 A2 | 12/2023 |

OTHER PUBLICATIONS

Kvirkvelia et al. Investigation of factors influencing the immunogenicity of hCG as a potential cancer vaccine. Clinical and Experimental Immunology, 2018, 193: 73-83.*
Terrazzini et al. DNA immunization with plasmids expressing hCGb-chimeras. Vaccine (2004) 22: 2146-2153.*
He et al. A Novel Human Cancer Vaccine Elicits Cellular Responses to the Tumor-Associated Antigen, Human Chorionic Gonadotropin beta. Clinical Cancer Research, 2004, 10: 1920-1927.*
Fiedler et al. mRNA Cancer Vaccines. Recent Results Cancer Res. 2016; 209:61-85. doi: 10.1007/978-3-319-42934-2_5.*
Fukuoka et al. Development of Repeatable Microcatheter Access Port for Intra-arterial Therapy of Liver Cancer. Cardiovasc Intervent Radiol (2019) 42:298-303.*
Nilsson et al., (2013), "Soluble TNF receptors are associated with infarct size and ventricular dysfunction in ST-elevation myocardial infarction." PloS one, 8(2), e55477. https://doi.org/10.1371/journal.pone.0055477, (16 pages).
Neirynck et al., (2015), "Soluble tumor necrosis factor receptor 1 and 2 predict outcomes in advanced chronic kidney disease: a prospective cohort study." PloS one, 10(3), e0122073. <https://doi.org/10.1371/journal.pone.0122073>, (18 pages).
Carlsson et al., (2018). "10-Year Associations Between Tumor Necrosis Factor Receptors 1 and 2 and Cardiovascular Events in Patients With Stable Coronary Heart Disease: A Claricor (Effect of Clarithromycin on Mortality and Morbidity in Patients With Ischemic Heart Disease) Trial Substudy." Journal of the American Heart Association, 7(9), e008299. <https://doi.org/10.1161/JAHA.117.008299>, (17 pages).
Mendelson et al., "Epigenome-Wide Association Study of Soluble Tumor Necrosis Factor Receptor 2 Levels in the Framingham Heart Study," Front. Pharmacol., Apr. 24, 2018, Sec. Experimental Pharmacology and Drug Discovery vol. 9, <https://doi.org/10.3389/fphar.2018.00207>, (13 pages).
Felicita Andreotti et al., "Anti-inflammatory therapy in ischaemic heart disease: from canakinumab to colchicine," European Heart Journal Supplements, vol. 23, Issue Supplement_E, Oct. 2021, pp. E13-E18, <https://doi.org/10.1093/eurheartj/suab084>, (6 pages).
Amirfakhryan H. (2020). "Vaccination against atherosclerosis: An overview. Hellenic journal of cardiology : HJC = Hellenike kardiologike epitheorese," 61(2), pp. 78-91. https://doi.org/10.1016/j.hjc.2019.07.003, (49 pages).
Henderson et al., Feb. 1, 2021, "Cap 1 messenger RNA synthesis with co-transcriptional cleancap® analog by in vitro transcription." Current Protocols, 1, e39. doi: 10.1002/cpz1.39, (27 pages).
TriLink Biotechnologies, "CleanCap® Reagent AG—(N-7113),"<https://www.trilinkbiotech.com/cleancap-reagent-ag.html> webpage available at least as early as Sep. 20, 2020f, (3 pages).
International Patent Office Search Report and Written Opinion for Application No. PCT/US23/68270 dated Dec. 12, 2023 (23 pages).
International Search Report and Written Opinion for Application No. PCT/US2024/043536 dated Dec. 13, 2024 (14 pages).

(Continued)

*Primary Examiner* — Nianxiang Zou
(74) *Attorney, Agent, or Firm* — Michael Best & Friedrich LLP

(57) ABSTRACT

Described herein is a method for cancer immunotherapy by administering to a subject an mRNA vaccine designed to express the carbonyl terminal segment of human chorionic gonadotropin (hCG). Also described an improved adjuvant by co-administration of an antisense IL-10 molecule to shift the vaccine immune response to enhanced T-cell responses to hCG. Other embodiments relate to devices and methods for improved delivery of the mRNA vaccine and adjuvant. The intended use involves repeated administration of the vaccine components to subjects over an interval of several months in a repeated boosting strategy.

19 Claims, 1 Drawing Sheet

Specification includes a Sequence Listing.

(56) References Cited

OTHER PUBLICATIONS

International Preliminary Report on Patentability for Application No. PCT/US2023/068270 dated Nov. 15, 2023 (10 pages).
Iversen et al., A novel therapeutic vaccine targeting the soluble TNFα receptor II to limit the progression of cardiovascular disease: AtheroVax™, Frontiers, Cardiovasc. Med. 10:1206541, published Jul. 18, 2023 (10 pages).
Pasparakis et al., Immune and Inflammatory Responses in TNFa-deficient Mice: A Critical Requirement for TNFa in the Formation of Primary B Cell Follicles, Follicular Dendritic Cell Networks and Germinal Centers, and in the Maturation of the Humoral Immune Response, J. Exp. Med. 184: 1397-1411, Oct. 1996 (15 pages).
Gribskov et al., Sigma factors from E. coli, B. subtilis, phage SPOI, and phage T4 are homologous proteins, Nucl. Acids Res. 14(6): 6745-6763, published Jul. 23, 1986 (20 pages).
Schumacher et al., Tumor Necrosis Factor-α in Heart Failure: an Updated Review, Curr. Cardiol. Rep. 20(11):117, published Sep. 26, 2018 (20 pages).
Mercogliano et al., Harnessing Tumor Necrosis Factor Alpha to Achieve Effective Cancer Immunotherapy, Cancers 13 (3): 564, published Feb. 2, 2021 (33 pages).
Ciebiera et al., The Role of Tumor Necrosis Factor α in the Biology of Uterine Fibroids and the Related Symptoms, Int. J. Mol. Sci. 19(12): 3869, published Dec. 4, 2018 (26 pages).
Qin et al., In Vivo Evaluation of a Morpholino Antisense Oligomer Directed Against Tumor Necrosis Factor-α, Antisense Nucleic Acid Drug Dev. 10(1):Feb. 11-26, 2000 (6 pages).
Yao et al., Association between tumor necrosis factor-α and chronic obstructive pulmonary disease: a systematic review and meta-analysis, Ther. Adv. Resp. Dis. 13:1753466619866096, published Jun. 19, 2019 (17 pages).
Zhao et al., Tristetraprolin Down-Regulation Contributes to Persistent TNF-Alpha ExpressionInduced by Cigarette Smoke Extract through a Post Transcriptional Mechanism, PLOS One, 11(12): e0167451, published Dec. 2, 2016 (19 pages).
Feng et al., Sesamol Attenuates Neuroinflammation by Regulating theAMPK/SIRT1/NF-κB Signaling Pathway after Spinal CordInjury in Mice, Ox. Med. Cell. Longev. 2022: 8010670, published Jan. 6, 2022 (18 pages).
Bader El Din, Tumor necrosis factor-α-G308A polymorphism is associated with liver pathological changes in hepatitis C virus patients, World J. Gastroenterol. 22(34): 7767-77, published Sep. 14, 2016 (12 pages).
Hong et al., "Proinflammatory cytokine TNFα promotes HPV-associated oral carcinogenesis by increasing cancer stemness", Int. J. Oral. Sci. 12(1):3, published Jan. 7, 2020 (10 pages).
Imlay et al., Current Understanding of Cytomegalovirus Reactivation in Critical Illness, J. Infect. Dis. 221(S1): S94-102, published Mar. 5, 2020 (9 pages).
Forte et al., Tumor Necrosis Factor Alpha Induces Reactivation of Human Cytomegalovirus Independently of Myeloid Cell Differentiation following Posttranscriptional Establishment of Latency, 9(5):e01560-18, published Sep. 11, 2018 (15 pages).
Duan et al., Deficiency of Tfh Cells and Germinal Center in Deceased COVID-19 Patients, Curr. Med. Sci. 40(4): 618-624, published Aug. 29, 2020.
Cagin et al., Effects of dexpanthenol on acetic acid-induced colitis in rats, Exp. Ther. Med. 12(5): 2958-2964, published Sep. 20, 2016 (7 pages).
ELx808 Ultra Microplate Reader, BioTek Instruments GmbH, Lucerne, Switzerland, <https://www.marshallscientific.com/BioTek-ELx808-Ultra-Microplate-Reader-Absorbance-p/b-e808.htm>, publicly available as early as Oct. 1, 2022 (12 pages).

\* cited by examiner

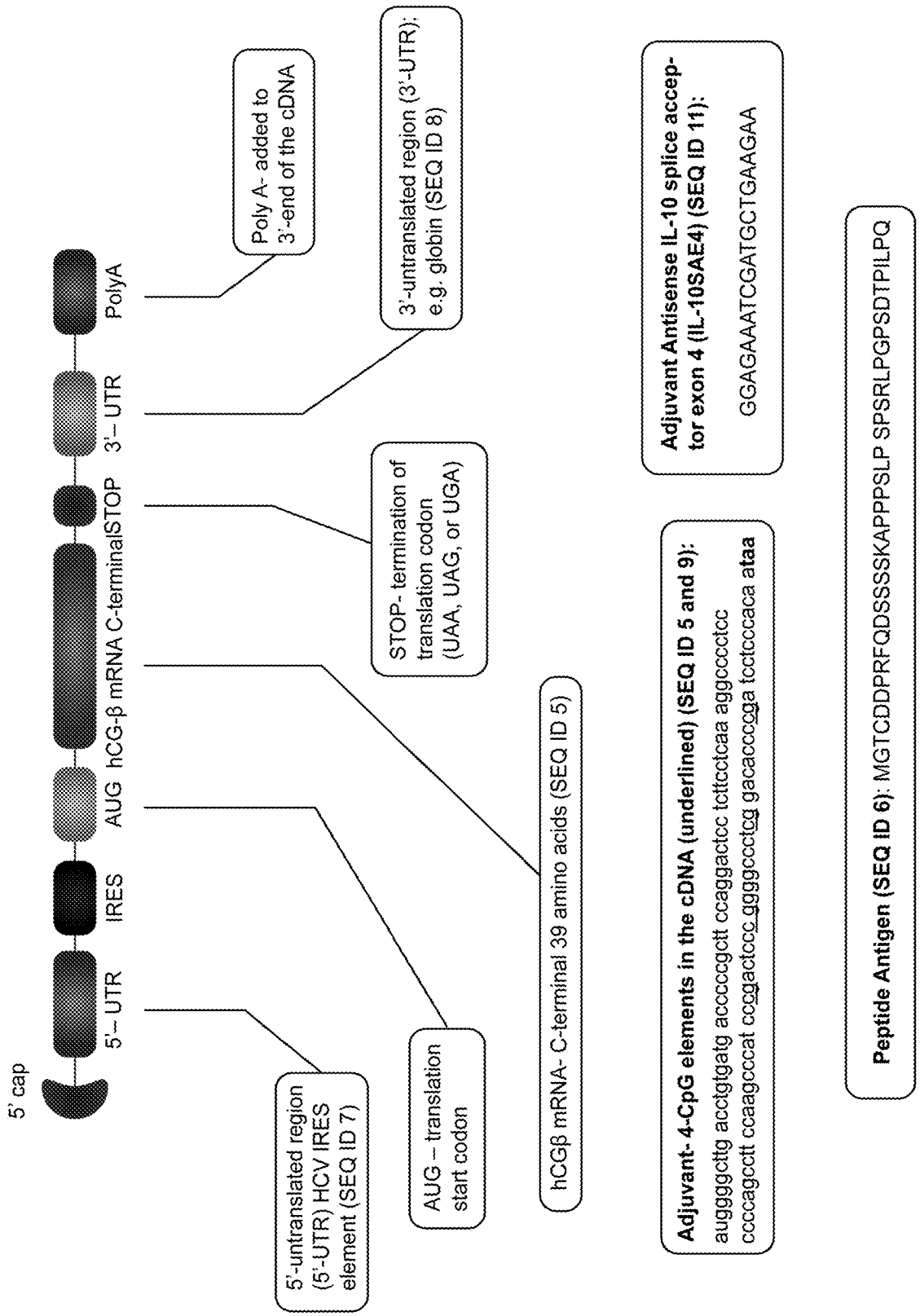

THERAPEUTIC mRNA VACCINE FOR MALIGNANCIES

CROSS-REFERENCE TO RELATED APPLICATIONS

This application claims priority to U.S. Provisional Application No. 63/208,581, filed on Jun. 9, 2021, which is incorporated by reference herein in its entirety.

REFERENCE TO SEQUENCE LISTING

This application is filed with a Computer Readable Form of a Sequence Listing in accordance with 37 C.F.R. § 1.821(c). The text file submitted by EFS, "054228-9015-US02_sequence_listing_3-JUN-2022_ST25.K" was created on Jun. 3, 2022, contains 13 sequences, has a file size of 7.03 Kbytes, and is hereby incorporated by reference in its entirety.

TECHNICAL FIELD

Described herein is a method for cancer immunotherapy by administering to a subject an mRNA vaccine designed to express the carbonyl terminal segment of human chorionic gonadotropin (hCG). Also described an improved adjuvant by co-administration of an antisense IL-10 molecule to shift the vaccine immune response to enhanced T-cell responses to hCG. Other embodiments relate to devices and methods for improved delivery of the mRNA vaccine and adjuvant. The intended use involves repeated administration of the vaccine components to subjects over an interval of several months in a repeated boosting strategy.

BACKGROUND

The first vaccines were created to prevent viral infections. The practice of taking scabs or crusts of skin from a patient recovering from natural infection with variola (smallpox) and rubbing this into cuts in the skin of an uninflected person was introduced into England in 1718, a process referred to as variolation. It is thought the virus had been dried and due to the late stage of infection the virus would have been inactivated (killed). Variolation was associated with failures in which live virus infected the patients and deaths were observed and the practice was banned in Britain in 1840. In 1769, Edward Jenner utilized a virus from infected cows (vaccinia; cowpox) to inject into the skin of uninflected patients in a process referred to as vaccination. The techniques involving either live-attenuated and inactivated virus continue to present day in the preparation of vaccines for a multitude of infectious diseases including polio, measles, mumps, rubella, rabies, influenza, rotavirus, chicken pox and hepatitis A virus. Neither of these techniques are applicable for the preparation of a "cancer vaccine."

The use of a peptide, historically a segment of a virus protein, combined with an adjuvant, allows for the creation of subunit vaccines. Since the patient is not exposed to the pathogen, this approach is safe for immune compromised patients and cannot cause disease. Another advantage is the protein subunit vaccines are relatively stable and easy to store. However, the protein subunit vaccines are less immunogenic, so they require adjuvants, higher doses, and multiple booster doses. The CTP37 vaccine was a subunit vaccine and limited immunogenicity is the driving force for creating a significantly improved hCG vaccine for cancer.

Alternative vaccine technologies have been emerging including DNA and vectored vaccines. DNA vaccines are prepared in bacterial plasmids and thus require a bacterial origin of replication and a variety of selectable genes in bacteria. Purification of the vaccine DNA may carry a limited amount of these elements which represent a risk to a patient. An advantage of a DNA vaccine over an RNA vaccine is based on the greater stability of DNA over RNA. However, DNA vaccine disadvantages include potential for recombination with a patient's genome and the DNA must enter the cell nucleus, carry information for initiating RNA transcription, and signals for export from the cell nucleus before the transcribed RNA can be translated into the protein antigen.

Finally, vectored vaccines can be divided into replication competent and replication incompetent vectors. Current vectors include viruses such as mumps, measles, vesicular stomatitis virus (VSV) and adenovirus (Ad). The viral vector carries a segment of DNA that may produce a desired peptide antigen in a patient. The vectored vaccines produce a stronger immune response than DNA vaccines but also present multiple risks to the patient. One significant limitation is the immune response to the vector which may be significantly greater than the desired antigen particularly in boost doses. One vectored vaccine that has been approved for human use is for the prevention of Ebola virus disease (EVD) which uses the VSV vector. A second vectored vaccine has received EUA for the prevention of COVID-19 using an adenovirus vector. While vectored vaccines are attractive, they may carry liabilities when used in cancer patients as therapeutic vaccines based on potential interactions between tumor and viral origins of replication. Indeed, this interaction was exploited in the preparation of tumor cell lyric vaccines.

Human chorionic gonadotropin (hCG) is a hormone and glycoprotein compromised of two subunits ($\alpha$ and $\beta$). hCG typically plays a primary role in pregnancy as it stimulates rapid cell growth, stimulates blood vessel formation, and promotes immunosuppression. However, $\beta$-hCG specifically is also expressed by virtually every type of tumor cell (Table 1), playing a role in immune suppression and the induction of tumor angiogenesis (Iversen t al, 2003). The growth factor properties of $\beta$-hCG is in part explained by its structure, which contains a "cysteine-knot" that is equivalent to platelet-derived growth factor (PDGF)-$\beta$, transforming growth factor (TGF-$\beta$), and nerve growth factor (NGF) (Lapthorn et al. 1994). Many human cancers begin to produce, retain, and/or secrete $\beta$-hCG at some point during carcinogenesis (Alfthan et al., 1992, Han, 1975). Immunohistochemical studies of tumor specimens have demonstrated that hCG is present more often in tumors than circulating freely in the body (Campo et al., 1987, Buckley and Fox, 1979, Skinner and Whitehead, 1981). Notably, several pre-clinical studies have investigated the effect of $\beta$-hCG vaccines on tumor growth, demonstrating an inverse relationship between levels of circulating anti-hCG antibodies and tumor growth (Kellen et al, 1982; Acevedo et al., 1987).

TABLE 1

Expression of β-hCG in serum, urine, and tissue sections stratified by different carcinomas.

| Tissue Type | Serum β-hCG | Urine β-hCG | β-hCG Detection in Tissue Sections |
|---|---|---|---|
| Bladder | ++ | +++ | + |
| Lung | ++ | | ++++ |
| Oral/Facial | + | | ++ |
| Breast | | + | +++ |
| Cervical | + | ++ | ++ |
| Ovarian | +++ | | |
| Endometrial | + | + | |
| Vulval/Vaginal | ++ | + | |
| Colorectal | ++ | | ++++ |
| Prostate | + | + | + |
| Pancreas | ++ | | + |
| Renal | + | | |
| Neuro-endocrine | + | | |

Plus (+) denotes number of studies with positive detection. Adapted from Iles and colleagues (Iles et al., 2010).

The mRNA vaccine technology is the optimal approach to a cancer vaccine particularly when combined with an effective antigen such as hCG. The dose of 30 to 100 μg is orders of magnitude less than the mg doses of the CTYP37 protein subunit vaccine. The greater immunogenicity and demonstrated humoral and cell-mediated immunity make the mRNA vaccine likely to be superior to the CTP37 vaccine. GMP production is commercially available and two mRNA vaccines have received EUA approval from the FDA indicating the technology has feasible tolerability and efficacy.

The BNT162b2 mRNA vaccine for the prevention of coronavirus disease 2019 (COVID-19) with target antigen of the SARS CoV-2 spike protein received a temporary emergency use authorization (EUA) in December of 2020. The vaccine is a course of two intramuscular 30 μg doses with a recommended interval of 21 days (Lamb, 2021). The vaccine can elicit neutralizing antibodies as well as CD4+ Th1 responses and CD8+ cytotoxic T-cell responses. This is a key demonstration of an mRNA vaccine leading to both humoral and cell-mediated immunity (Walsh et al., 2020).

A second COVID-19 mRNA vaccine, mRNA-1273, also targeting the SARS-CoV-2 spike protein administered as a lipid-nanoparticle intramuscularly received EUA in December 2020. The dose of 100 μg administered twice with a recommended interval of 28 days also leads to both humoral and cell mediated immune responses (Tubman, 2020).

What is needed is a synthetic hCG peptide as a therapeutic vaccine for human cancer.

SUMMARY

One embodiment described herein is an mRNA vaccine encoding the cowboys terminal 37 amino acids of the beta subunit of human chorionic gonadotropin (SEQ ID NO: 9) and one or more pharmaceutically acceptable excipients in a solution form suitable for injection. In one aspect, the vaccine further comprises an antisense IL-10 splice acceptor exon 4 oligomer (SEQ ID NO: 11). In another aspect, the vaccine further comprises a protein subunit hCG-CTP37 vaccine (Avicine). In another aspect, the vaccine further comprises one or more monoclonal antibodies immunoreactive to hCG-CTP21 (SEQ ID NO:12) or hCG-CTP16 (SEQ ID NO: 13).

Another embodiment described herein is a method for treating a cancer in a subject comprising: administering to a subject an immune reactive dose of the vaccine described herein. In one aspect, the administration is repeated on a once per four-week schedule for a period of at least 12 to 16 weeks. In another aspect, the administration comprises a dose of 0.03 to 0.1 mg. In another aspect, the vaccine comprises an mRNA encoding hCG-CTP37 derivatized to a suitable carrier protein. In another aspect, the vaccine is augmented by drug delivery vehicles selected from nanoparticle drug carriers, liposomes, viral vectors, or microbubbles. In another aspect, the vaccine is administered to a solid tumor using a micro catheter. In another aspect, the vaccine is incorporated into substance-eluting beads. In another aspect, the substance-eluting beads comprise biocompatible, resorbable, or non-resorbable hydrogel beads comprising one or more of: PEG-based polymers; nanoparticle-containing hydrogels; hydrogels containing cyclodextrins (CDs); hydrophilic polymers or poly ethylene glycol (PEG) provides water solubility to hydrogels, other polymers like as poly lactic acid (PLA), poly ε-caprolactone (PCL), polypropylene oxide (PPO), poly D,L-lactide-co-glycolide (PLGA) and poly ε-caprolactone-co-D,L-lactide (PCLA); ultra-thermosensitive hydrogel; hydrogels with different systems, namely, emulsions, vesicular (including micelles, liposomes and nanocapsules) and particulate systems (including mainly solid lipid micro and nanoparticles, nanostructured lipid carriers and lipid drug conjugates); biocompatible hydrogel, composed of the copolymer poly(nisopropylamide-co-n-butyl methacrylate) [P(NIPAAm-co-BMA)] and PEG; A polyethylenimine (PEI)-based hydrogel; supramolecular hydrogels; DNA-hydrogels; bioinspired hydrogels; multi-functional and stimuli-responsive hydrogels; n-acrylic polymer impregnated with porcine gelatin; or gelatin. In another aspect, the substance-eluting beads comprise soybean lecithin entraping hydrophilic bone morphogenic protein-2 into nanoporous poly(lactide-co-glycolide)-based microspheres. In another aspect, the vaccine is delivered using an image guided percutaneous biopsy needle. In another aspect, the vaccine is delivered using a pressure-enabled micro catheter. In another aspect, the vaccine is delivered using a pressure-enabled micro catheter using a continuous flow. In another aspect, the vaccine is delivered using a pressure-enabled micro catheter using an automated pulsatile flow. In another aspect, the vaccine is delivered using biologic scaffolds. In another aspect, the vaccine is delivered using polymer scaffolds. In another aspect, the vaccine is delivered using biological and polymer reservoirs for sustained delivery of therapeutic vaccines.

BRIEF DESCRIPTION OF THE DRAWINGS

FIG. 1 shows the component parts of the hCG mRNA vaccine include a 5'-cap, the 5'-UTR including the HCV IRES sequence (SEQ ID NO: 7), the mRNA (SEQ ID NO: 5) encoding the hCG peptide antigen (SEQ ID NO: 6), the 3'-UTR (SEQ ID NO: 8) and a polyadenylation signal sequence. Vaccine adjuvants are indicated as CpG motifs indicated within SEQ IDs NO: 5 and 9 as well as the antisense oligonucleotide IL-10SAE4 (SEQ ID NO: 11).

DETAILED DESCRIPTION

Definitions

Unless otherwise defined, all technical and scientific terms used herein have the same meaning as commonly understood by one of ordinary skill in the art. For example, any nomenclatures used in connection with, and techniques of, cell and tissue culture, molecular biology, immunology, microbiology, genetics, and protein and nucleic acid chemistry and hybridization described herein are well known and commonly used in the art. In case of conflict, the present disclosure, including definitions, will control. Exemplary methods and materials are described below, although methods and materials similar or equivalent to those described herein can be used in practice or testing of the embodiments and aspects described herein.

As used herein, the terms "amino acid," "nucleotide," "polynucleotide," "vector," "polypeptide," and "protein" have their common meanings as would be understood by a biochemist of ordinary skill in the art. Standard single letter nucleotides (A, C, G, T, U) and standard single letter amino acids (A, C, D, E, F, G, H, I, K, L, M, N, P, Q, R, S, T, V, W, or Y) are used herein.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

All ranges disclosed herein include both end points as discrete values as well as all integers and fractions specified within the range. For example, a range of 0.1-2.0 includes 0.1, 0.2, 0.3, 0.4 . . . 2.0. If the end points are modified by the term "about," the range specified is expanded by a variation of up to ±10% of any value within the range or within 3 or more standard deviations, including the end points.

As used herein, the terms "active ingredient" or "active pharmaceutical ingredient" refer to a pharmaceutical agent, active ingredient, compound, or substance, compositions, or mixtures thereof, that provide a pharmacological, often beneficial, effect.

As used herein, the terms "control," or "reference" are used herein interchangeably. A "reference" or "control" level may be a predetermined value or range, which is employed as a baseline or benchmark against which to assess a measured result. "Control" also refers to control experiments or control cells.

As used herein, the term "dose" denotes any form of an active ingredient formulation or composition, including cells, that contains an amount sufficient to initiate or produce a therapeutic effect with at least one or more administrations. "Formulation" and "composition" are used interchangeably herein.

As used herein, the term "prophylaxis" refers to preventing or reducing the progression of a disorder, either to a statistically significant degree or to a degree detectable by a person of ordinary skill in the art.

As used herein, the terms "effective amount" or "therapeutically effective amount," refers to a substantially non-toxic, but sufficient amount of an agent, composition, or cell(s) being administered to a subject that will prevent, treat, or ameliorate to some extent one or more of the symptoms of the disease or condition being experienced or that the subject is susceptible to contracting. The result can be the reduction or alleviation of the signs, symptoms, or causes of a disease, or any other desired alteration of a biological system. An effective amount may be based on factors individual to each subject, including, but not limited to, the subject's age, size, type or extent of disease, stage of the disease, route of administration, the type or extent of supplemental therapy used, ongoing disease process, and type of treatment desired.

As used herein, the term "subject" refers to an animal. Typically, the subject is a mammal. A subject also refers to primates (e.g., humans, male or female; infant, adolescent, or adult), non-human primates, rats, mice, rabbits, pigs, cows, sheep, goats, horses, dogs, cats, fish, birds, and the like. In one embodiment, the subject is a primate. In one embodiment, the subject is a human.

As used herein, a subject is "in need of treatment" if such subject would benefit biologically, medically, or in quality of life from such treatment. A subject in need of treatment does not necessarily present symptoms, particular in the case of preventative or prophylaxis treatments.

As used herein, the terms "inhibit," "inhibition," or "inhibiting" refer to the reduction or suppression of a given biological process, condition, symptom, disorder, or disease, or a significant decrease in the baseline activity of a biological activity or process.

As used herein, "treatment" or "treating" refers to prophylaxis of, preventing, suppressing, repressing, reversing, alleviating, ameliorating, or inhibiting the progress of biological process including a disorder or disease, or completely eliminating a disease. A treatment may be either performed in an acute or chronic way. The term "treatment" also refers to reducing the severity of a disease or symptoms associated with such disease prior to affliction with the disease. "Repressing" or "ameliorating" a disease, disorder, or the symptoms thereof involves administering a cell, composition, or compound described herein to a subject after clinical appearance of such disease, disorder, or its symptoms. "Prophylaxis of" or "preventing" a disease, disorder, or the symptoms thereof involves administering a cell, composition, or compound described herein to a subject prior to onset of the disease, disorder, or the symptoms thereof. "Suppressing" a disease or disorder involves administering a cell, composition, or compound described herein to a subject after induction of the disease or disorder thereof but before its clinical appearance or symptoms thereof have manifest.

The terms below and used herein, have the following meanings, unless otherwise indicated:

"Antigen" is a molecule that will trigger an immune response, abbreviated by "Ag." An Ag may originate from within the body (a self-protein) or from an external site (non-self). The immune system may not react to self-proteins due to negative selection of T-cells in the thymus during development.

"Negative selection" is a process in which lymphocytes, capable of strong binding with self-protein defined by the major histocompatibility complex (MHC) are removed by receiving an apoptosis signal leading to cell death. Some lymphocytes are phagocytosed by dendritic cells which allows presentation of self-antigens to MHC class II, a requirement for CD4+ T-cell negative selection. Some of these T-cells responding to self-proteins become Treg (T-regulatory) cells. The process is a component of central tolerance prevents formation of cells capable of inducing autoimmune diseases.

An "antibody" is a "Y" shaped protein, immunoglobulin (Ig), with an antigen binding site and an Fc region. Antibodies from humans include several classes or isotypes; IgA, IgD, IgE, IgG, or IgM. The IgG is composed of four polypeptide chains; two heavy chains and two light chains connected by disulfide bonds. The light chains contain one variable domain (VL) and one constant domain (CL) and the heavy chains contain one variable domaine (VH) and three to four constant domains (CH1, CH2, CH3). Structurally, an antibody has two antigen binding fragments (Fab) composed of VL, VH, CL, and CH1 and a Fc fragment forming the trunk of the Y.

A "T-Cell" is a type of white blood cells, a lymphocyte, that plays a central role in the Adaptive immune response. T-cells a differentiated from other lymphocytes by the presence of a T-cell receptor (TCR) on the cell surface. Multiple classes of T-cells are defined; CD8 killer T-cells, CD4 helper T-cells, and regulatory T-cells. Each class of T-cell performs a different function often involving release of cytokines. All T-cells originate from c-kit+Sca1+ hematopoietic stem cells (HSC) that reside in the bone marrow.

An "Epitope" is a structural feature of an antigen that is an antigenic determinant that matches an antibody recognition site.

"Vaccination" is the physical administration of a vaccine

"Immunization" is the provision of immunity by any means, active or passive

"Active immunization" is the administration of agents for induction of immunity that is long-lasting or at times, life-long "Passive immunization" is the administration of exogenously produced immune substances (e.g., convalescent serum, adoptive transfer of T-cells, or monoclonal antibodies) that dissipates with the turnover of the administered substances A "vaccine" is the conveyance of antigens to elicit immune responses that are generally protective. Multiple approaches to vaccine design are known including; attenuated virus, inactive virus, protein subunit, DNA vaccines, vectored vaccines, and mRNA vaccines.

"Vaccine adjuvant" is a substance that increases and/or modulates the immune response to a vaccine antigen. Adjuvants can be inorganic compounds (potassium alum, aluminum hydroxide, aluminum phosphate, calcium phosphate hydroxide), oils (paraffin oil, peanut oil, squalene), bacterial products (*mycobacterium* Boris, toxoids, lipopolysaccharides), plant products (saponins), cytokines (IL-1, IL-2, IL-12), and stimulators of innate immune responses by binding Toll receptors (TLR ligand including CpG motifs).

"RNA" is a ribonucleic acid and a polymeric molecule essential for coding, decoding, regulation and expression of genes. Cellular organisms use messenger RNA (mRNA) to convert genetic information as guanine (G), uracil (U), adenine (A), and cytosine (C) as triplets into selection of amino acids in synthesis of specific proteins "RNA vaccine" is a type of vaccine that uses a copy of a messenger RNA (mRNA) to express an antigen to produce an immune response as well as stimulate innate immune responses.

"Open reading frame" is the sequence of nucleic acid mRNA that is translated into protein. It is referred to as open to contrast reading frames containing termination codons.

"Untranslated region" is abbreviated as UTR refers to sections of mRNA flanking the ORF. On the 5'-side it is the 5'-UTR or leader and on the 3'-side it is the 3'-UTR or trailer. The 5'-UTR contains sequence that is recognized by the ribosome and facilitates the initiation of translation. The 3'-UTR is located immediately after the translation termination codon and facilitates post-transcriptional modification.

"Kozak consensus sequence" is this sequence that contains the initiation start of translation and contains the sequence 5'-ACCAUGG-3' where the AUG is the first methionine codon in an mRNA transcript.

The sections herein will describe methods of administering the vaccine, methods of producing the vaccines, compositions comprising the vaccines, and nucleic acids encoding the vaccines. In some embodiments the vaccine may be compromised of an adjuvant as describe herein.

Design, Synthesis, and Production

The solid phase synthesis of a cDNA can be acquired from a number of commercial vendors. The synthesized cDNA is inserted or lighted into a commercially available bacterial plasmid (pDNA) that contains an origin of replication, antibiotic selectable resistance genes, and bacteriophage T7 polymerase (or any bacteriophage RNA transcription polymerase such as T3 for SP6). The pDNA is used to transform a competent bacteria grown in an appropriate antibiotic to select for a pDNA transformed bacteria that will allow growth and amplification of the pDNA. The manufactured pDNA can be retrieved from the bacteria by lysis of the bacteria and separation of pDNA from the bacterial chromosomal DNA by centrifugation and ethanol precipitation.

The closed circular pDNA is linearized using a commercially available restriction endonuclease that allows separation of the linear form from other DNA by size exclusion chromatography. In vitro transcription of mRNA from the T7 polymerase includes nucleotide triphosphates (NTP) and a 5'-cap can be added. The 5'-cap is an option since the vaccine has an internal ribosomal entry site (IRES) in the 5'-untranslated region (5'-UTR). Extraction and precipitation steps remove unincorporated NTP and NTP metabolites, but some incomplete or shorter RNA will remain. Size exclusion chromatography separates mRNA based on size will remove shorter incomplete mRNA as well as contaminating double stranded RNA (dsRNA). Removal of dsRNA that may form is key in that it can stimulate unwanted innate immune responses. These processing steps are currently available at commercial GMP facilities that will ensure FDA compliant substance for human clinical use.

Modifications

RNA sensing by the 2'-5'-oligoadenylate synthetase (OAS) pathway resulting in RNase L-mediated RNA cleavage including the cellular ribosomal RNA (rRNA). The RNase L cleavage limits the mRNA vaccine half-life and reduces translation of mRNA (Anderson et al., 2011). RNA synthesized to include 2'-O-methylated ribose, 5-methyluridines, or pseudouridine nucleosides do not activate the OAS sensing pathway and induction of the RNase L nuclease resulting in more durable translation of the mRNA vaccine.

Synthetic mRNA with a 5'-end modification, a 5'-CAP, confers greater mRNA vaccine stability and enhanced translatability. The natural cap structure is an N7-methylated guanosine (m7G) connected by a 5'-to 5'-O-triphosp0hate bridge. In some cases, a 2'-O-methylation of the +1 nucleotide ribose results in a cap structure m7GpppN2'OmeN. The synthesis of the natural cap can be complex and an alternate synthetic "CleanCap AG trimer" (Tri Link Biotechologies, cat no. N-7113) can be added in vitro using a T7 RNA polymerase (Henderson et al., 2021).

Pharmaceutical Vaccine Compositions

The composition of the hCG mRNA vaccine is illustrated in FIG. 1. The hCG mRNA vaccine is composed of an mRNA nucleobase sequence (SEQ ID NO: 5) encoding the C-terminal 37 amino acids of hCG beta and a translation initiation site defined by a Kozak consensus AUG (amino acid product is SEQ ID NO: 6) identified in the artificial sequence. Immediately upstream of the hCG mRNA is a 5'-UTR that may include the nucleobase sequence for the hepatitis C virus internal ribosomal entry site (SEQ ID NO: 7) designed to improve vaccine stability and enhance translation. The 5'-terminus of the vaccine may include a "CAP" structure as either an N7-methylated guanine (m7GpppN), a dimmer cap structure including a 2'-O-methylated ribose at N+1 (m7GpppN2'OmeN), or a synthetic "CleanCap" trimer. Immediately downstream from the hCG mRNA is a translation termination codon, UAA, followed by a 3'-UTR that may include the nucleobase sequence of the human beta-globin 3'-UTR (SEQ ID NO: 8) known to improve mRNA stability and improve translation of the hCG mRNA. At the 3'-terminus of the vaccine is a polyadenylation signaling sequence, AAUAAA (included in SEQ ID NO: 8).

The compositions of the vaccine adjuvant include four CpG sequences within the hCG mRNA (SEQ ID NO: 5) known to stimulate innate immune surveillance pathways through toll-like receptors. In addition, an antisense oligonucleotide designed to bind near the splice acceptor region of exon 4 of interleukin 10 capable of inhibiting the expression of IL-10.

IL-10 is an anti-inflammatory glycoprotein that participates in the regulation of immunity. IL-10 inhibits the activity of Th1 cells (a sub population of CD4+ T-cells), natural killer T-cells (NK), and macrophages that contribute to clearance of tumor tissue and infected cells. Expression and secretion of IL-10 inhibits the synthesis of interferon gamma (IFN-γ), IL-2, IL-3, tumor necrosis factor (TNF), and GM-CSF produced by activated macrophages and helper T-cells resulting in the inhibition of immune responses participating in clearance of tumor cells. Several immune cell type express IL-10 including macrophages, dendritic cells, B-cells, and subsets of CD4+ and CD8+ T-cells.

An antisense oligonucleotide designed to bind to the splice acceptor region of exon four of IL-10 pre-mRNA (sequence 5'-GGA GAA ATC GAT GCT GAA GAA-3'; IL-10E4SA; SEQ ID NO: 11) led to skipping of exon 4 in the mature mRNA and reduced translation to the IL-10 protein. The IL10E4SA was determined to be optimal in targeting a variety of IL-10 transcript sites (Panchal et al., 2014). The inhibition of IL-10 protein in freshly isolated bone-marrow derived cells cultured to promote differentiation into dendritic cells was sequence specific, dose, and time dependent. When administered to mice that were challenged with a lethal mouse adapted Ebola virus, a survival benefit was observed in 7 replicate experiments of 10 mice in each treatment group for a cumulative of 41 survivors in the 70 infected mice compared to less than 10 survivors in 70 infected mice in vehicle control groups. Antibody depletion studies in IL-10$^{-/-}$ mice suggest a role for NK cells and IFN-gamma for the improved immune response in clearing infected cells. The capacity to shift Th1/Th2 balance with IL-10E4SA antisense oligomers represents a unique adjuvant strategy for an anti-cancer vaccine.

Pharmaceutical Formulations

Intravenous Injections

Phosphate buffered saline (PBS) containing inactive ingredients-potassium phosphate mono basic, anhydrous, USP; potassium chloride, USP; sodium phosphate diabetic, anhydrous, USP; sodium chloride, USP; and water for injection, USP. Active ingredients include mRNA with and without antisense IL-10E4SA. The phosphate buffered saline with and without enhanced delivery agents including lipid nanoparticles (LNP) including but not limited to lipids (including ((4-hydroxybutyl)azanediyl)bis (hexane-6,1-diyl)bis (2-hexyldecanoate), 2[(polyethylene glycol)-2000]-N,N-ditetradecylacetamide, 1,2-distearoyl-sn-glycero-3-phosphocholine, and cholesterol), perflourocarbon micro bubbles (C4F10 or C5F12), or cationic peptides including but not limited to ArgArgArgArgArgArgGly ($R_6G$).

Intramuscular Injections

A PBS solution as described for intravenous injection including mRNA with and without antisense IL-10E4SA administered in a solution of less than one milliliter into a muscle, e.g., the shoulder. The PBS solution with or without enhanced delivery agents including lipid nanoparticles (LNP) or cationic peptides including but not limited to $R_6G$.

Inhalation

A PBS solution as described for intravenous injection including mRNA with and without antisense IL-10E4SA administered by an aerosol spray delivery device intranasally.

A dry powder composed of aerodynamic particle size distribution—a fine particle fraction (FPF) greater than 50 percent, a mean mass aerodynamic diameter (MMAD) of 2.0-2.5 micrometers, emitted dose (ED) of greater than 35 percent neat mRNA with and without IL-10E4SA and salt. The dry powder will be delivered by a flow-controlled inhalation metered device.

Oral

An oral rehydration solution (ORT) composed of 2.6 g NaCl, 2.9 g trisodium citrate, 1.5 g potassium chloride, 13.5 g anhydrous glucose, and mRNA with and without antisense IL-10E4SA in one liter of water.

An oral solid dosage (pills or capsules) containing mRNA with or without antisense IL-10E4SA and excipients including binders, glidants, disintegrants, and lubricants to facilitate fill formation and dissolution in the gut.

Formulations, Administration, Delivery, and Dosing

Formulations

The linear mRNA can be formulated by multiple strategies indicated in this document. Patients seeking vaccination will have confirmed disease and will be screened for prior adverse reactions to vaccines to exclude patients that may experience serious adverse reactions. No concurrent chemotherapy is permitted due to likelihood of immune suppressive actions of chemotherapy that may limit the efficacy of an hCG mRNA vaccine. Both male and female patients of all ethnic and ideological groups are included. Female patients of childbearing age are advised that the hCG mRNA vaccination will prevent pregnancy.

Administration

The hCG mRNA vaccine is administered by routes of administration described in this document such as intratumoral or intramuscular at doses of 0.03 to 0.10 mg of the hCG mRNA vaccine. The initial vaccination is designated day 0 and additional vaccinations will be administered at week 4, week 10, and week 16 to boost vaccine response. Patients are monitored for disease progression by standard procedures under the care of a qualified oncologist.

TABLE 2

Exemplary administration protocol.

| Day | Day 0 | Week 4 | Week 10 | Week 16 |
|---|---|---|---|---|
| Dose | Initial | Booster+ | Booster+ | Booster+ |

Delivery Methods

Direct pulmonary delivery (e.g., aerosol, inhalers, etc.) is a more selective mode of drug delivery that typically requires a lower quantity of drug. But it can have limited efficacy due to improper dosing, stability issues, and difficulty in producing an optimum particle size. Pulmonary drug delivery can provide the following advantages: quick onset of action coupled with ease and convenience of administration; the pulmonary dose is significantly lower than the oral dose; and degradation of the drug in the liver can be avoided. On the other hand, the following drawbacks are often associated with pulmonary drug delivery: improper dosing; stability problems; and difficulty in producing the optimum particle size. In addition, not all drugs can be delivered via a pulmonary route due to formulation difficulties.

Local therapeutic administration to solid tumors can be buttressed by using different types of drug delivery vehicles (nanoparticle drug carriers, liposomes, viral vectors, or microbubbles). The latter adhere to sites of damaged vascular endothelium and thus may be a method of systemically targeting delivery of therapeutics to organ damaged. For example, perfluorobutane gas microbubbles with a coating of dextrose and albumin efficiently bind to different pharmaceuticals. These 0.3-10.0 μm particles bind to sites of vascular injury. Further, the perfluorobutane gas is an effective cell membrane fluidizer. The potential advantages of microbubble carrier delivery include none to minimal (additional) vessel injury through delivery, no resident polymer to degrade and lead to eventual inflammation, rapid bolus delivery, and repeated delivery. Microbubble carriers were successfully used in different animal models and clinical trials to deliver antisense oligonucleotide and/or Sirolimus to the injured vascular bed.

Extracellular Vesicles (EV)

Kumar and colleagues describe the use of extracellular vesicles (EVs), which are a family of natural carriers in the human body. EVs play a critical role in cell-to-cell communications and can be used as unique drug carriers of therapeutic vaccine to tumors. Though the authors of the reported investigations concluded that certain limitations need to be overcome as well as understanding the mechanism to control targeted delivery. Specifically, the isolation and drug encapsulation techniques employed to engineer EVs could result in the loss of functional properties of the EVs, such as the destruction of surface proteins. These unintended changes could lead to nonspecific interactions with other cells, leading to off-target effects, toxicity, and suboptimal efficacy.

Adenosine Nanoparticles

Recently, the efficacy in mitigating inflammation was demonstrated through the targeted delivery of adenosine and of multi-drug formulations. Bioconjugation of adenosine to squalene produces a prodrug-based nanocarrier, which, after nano for-mulation with Vit E, yields stable multidrug nanoparticles. This nanoparticle improves the bioavailability of both drugs with significant pharmaceutical activity in models of acute inflammatory injury.

Novel Bio-Objects

A group of researchers has succeeded in engineering a new kind of microscopic bio-object that may one day be used for personalized diagnostics and targeted delivery of drugs. The object consists of a genetically modified E. coli bacterium and nano-erythrocytes (small vesicles made of red blood cells), and it demonstrates a substantial improvement in motility over previous designs.

Nanobodies

In some embodiments therapeutic vaccine can be delivered using nanobodies. Indeed several researchers have shown that nanobodies—which are tiny immune proteins can enhance site specific delivery and residence of vaccines.

Nanomicells

In brain tumors vaccine maybe delivered brain-derived neurotrophic factor mRNA using polyplex nanomicelle.

Ischemic neuronal death causes serious lifelong neurological deficits; however, there is no proven effective treatment that can prevent neuronal death after the ischemia. We investigated the feasibility of mRNA therapeutics for preventing the neuronal death in a rat model of transient global ischemia (TGI). By intraventricular administration of mRNA encoding brain-derived neurotrophic factor (BDNF) using a polymer-based carrier, polyplex nanomicelle, the mRNA significantly increased the survival rate of hippocampal neurons after TGI, with a rapid rise of BDNF in the hippocampus.

The nanomicelle has a core-shell structure surrounded by a PEG outer shell and an mRNA-containing core for stable retention of the mRNA in the nanomicelle. The local administration of mRNA loaded nanomicelles has already shown therapeutic potential in various organs, such as the liver, joint cartilage, intervertebral disk and the neural tissues, including the brain nanomicelles can also block the immune responses to extracellular mRNA by shielding them from recognition by the toll-like receptors in target cells.

In some embodiments the problems associated with systemic delivery may be overcome by using intra-arterial or intravenous selective delivery of therapeutic agents using a percutaneous trans-catheter route to deliver a therapeutic agent for treating solid organ tumors.

In some embodiments, a micro-catheter is introduced into a tumor feeding artery and/or its branches and a therapeutic agent for treating is infused through the micro-catheter. In some embodiments, the therapeutic agent is infused via an intravenous and/or intraarterial route using a micro-catheter.

In some embodiments, the therapeutic agent delivery via the micro-catheter is pressure-enabled using a continuous flow. In some embodiments, the therapeutic agent delivery via the micro-catheter is pressure-enabled using an automated pulsatile flow. Optionally, pumping the therapeutic agent out via the micro-catheter may be synchronized with the subject's breathing.

Different configurations of micro-catheters may be used with or without antireflux occluders including balloons; metallic constructions or fluid based vascular plugs. Any of the pharmaceuticals mentioned above may be delivered in a liquid state via the subject's blood, optionally with mixture of contrast agent and/or saline.

Alternatively, different carriers such as micro-particles, nanoparticles, injectable polymers or natural carriers and others may be used to enhance penetration and residence of therapeutics at the target area.

In some embodiments, a therapeutic vaccine is incorporated into substance-eluting beads (e.g., based on hydrogel and/or nanoparticles), and those beads are delivered via a micro-catheter using the blood vessels described above. The substance-eluting beads may be made, for example, by applying soybean lecithin to entrap hydrophilic bone morphogenic protein-2 into nanoporous poly(lactide-co-glycolide)-based microspheres. Other examples of materials that are suitable for forming the substance-eluting beads include but are not limited to biocompatible, resorbable, or non-resorbable hydrogel beads. The beads may optionally be produced from polyvinyl alcohol and may contain a covalently bound radiopaque moiety. Saccharose beads, etc. may be used.

Other examples include silicon-based hydrogels; PEG-based polymers; nanoparticle-containing hydrogels; hydrogels containing cyclodextrins (CDs); hydrophilic polymers or poly ethylene glycol (PEG) provides water solubility to hydrogels, other polymers like as poly lactic acid (PLA), poly ε-caprolactone (PCL), polypropylene oxide (PPO), poly D,L-lactide-co-glycolide (PLGA) and poly ε-caprolactone-co-D,L-lactide (PCLA); ultra-thermosensitive hydrogel; hydrogels with different systems, namely, emulsions, vesicular (including micelles, liposomes and nanocapsules) and particulate systems (including mainly solid lipid micro and nanoparticles, nanostructured lipid carriers and lipid drug conjugates); biocompatible hydrogel, composed of the copolymer poly(nisopropylamide-co-n-butyl methacrylate) [P(NIPAAm-co-BMA)] and PEG; A polyethylenimine (PEI)-based hydrogel; supramolecular hydrogels; DNA-hydrogels; bioinspired hydrogels; and multi-functional and stimuli-responsive hydrogels; n-acrylic polymer impregnated with porcine gelatin; and gelatin.

In some embodiments, a therapeutic vaccine is incorporated into biological (Fibrin glue, fibrin matrix and collagen matrix) or different polymers drug delivery depots to increase residence of vaccine in target tumor area.

To avoid the disadvantages of oral or direct injection administration of drugs, a number of modes of administration of continuous dose, long-term delivery devices include reservoir devices, osmotic devices, and pulsatile devices for delivering beneficial agents have been utilized. Injecting drug delivery systems as small particles, microparticles or microcapsules avoids the incision needed to implant drug delivery systems. Microparticles, microspheres, and microcapsules, referred to herein collectively as "microparticles", are solid or semi-solid particles having a diameter of less than one millimeter, more preferably less than 100 microns, which can be formed of a variety of materials, including synthetic polymers, and proteins. Another intensively studied polymeric injectable depot system is an in-situ-forming implant system. In situ-forming implant systems are made of biodegradable products, which can be injected via a syringe into the body, and once injected, congeal to form a solid biodegradable implant.

In some embodiment's the vaccine can be delivered by image guided percutaneous interventional oncology procedure.

Examples for Transcatheter Delivery

One approach in lung cancer is to administer drugs locally using a pulmonary artery catheter (e.g., a Swan-Ganz catheter) via a pulmonary artery. For example, the catheter may be advanced into the superior vena cava, through the heart, and into the pulmonary artery, after which the therapeutic agent is delivered via the catheter. Two large, multicenter, randomized controlled studies have looked at the use of pulmonary artery catheters (PAC) in patients with shock and Acute Respiratory Distress Syndrome (ARDS) (Richard et al., 2003; National Heart Lung Blood Inst., 2006). PAC in the context of these trials were used to measure ventricular filling pressures, cardiac output, and other hemodynamic data, which the clinicians then used to guide treatment decisions. While there was no significant benefit shown in the use of PAC to guide decision making, there was no difference in mortality between the groups who did and did not receive a PAC. This may indicate that the use of PAC in patients with ARDS or acute lung injury does not pose an increased risk for mortality. Both studies indicated PAC-associated arrythmias as the most common complication. In the Richard PAC study, additional complications included arterial puncture and hemothorax. No deaths were attributable to ventricular fibrillation or arrhythmia. Several patients developed positive bacterial cultures following PAC insertion. In the NHLBI study, the rate of complications was no different between groups, and no deaths were related to the insertion of a catheter.

Dosing

The dosing of the hCG mRNA vaccine may range from 0.03 to 0.10 mg.

Each of the sequences described herein encompasses a chemically modified sequence or an unmodified sequence which includes no nucleotide modifications.

TABLE 3

Sequences

| Description | SEQ ID NO | FIG |
|---|---|---|
| Human Chorionic Gonadotropin Exons 1-3 | 1 | 1 |
| Human Chorionic Gonadotropin Protein | 2 | 1 |
| Human Chorionic Gonadotropin CTP-37 | 3 | 1 |
| Human Chorionic Gonadotropin CTP-37 | 4 | 1 |
| Human Chorionic Gonadotropin CTP-39 | 5 | 1 |
| Human Chorionic Gonadotropin CTP-39 | 6 | 1 |
| 5'-UTR based on HCV IRES | 7 | 1 |
| 3'-UTR based on beta-globin | 8 | 1 |
| Human Chorionic Gonadotropin CTP-39 (5'-UTR, ORF, 3'-UTR) | 9 | 1 |
| Human Chorionic Gonadotropin CTP-39 dimer 5'-UTR, 2 × ORF, 3'-UTR) | 10 | 1 |
| Interleukin-10 exon 4 splice acceptor antisense (IL-10E4SA) | 11 | 1 |
| CTP21 | 12 | |
| CTP16 | 13 | |

TABLE 4

Sequences

| Description | Sequence (5'→3') | SEQ ID NO: |
|---|---|---|
| Human Chorionic Gonadotropin Exons 1-3 Sequence Length: 498 | ATGGAGATGTTCCAGGGGCTGCTGCTGTTGCTGCTGCTGAGCATGGGCG GGACATGGGCATCCAAGGGAGCCGCTTCGGCCACGGTGCCGCCCCATCAA TGCCCACCCTGGCTGTGGAGAAGGAGGGCTGCCCCGTGTGCATCACCGTC AACACCACCATCTGTGCCGGCTACTGCCCCACCATGACCCGCGTGCTGC AGGGGGTCCTGCCGGCCCTGCCTCAGGTGGTGTGCAACTACCGCGATGT GCGCTTCGAGTCCATCCGGCTCCCTGGCTGCCCGCGCGGCGTGAACCCC GTGGTCTCCTACGCCGTGGCTCTCAGCTGTCAATGTGCACTCTGCCGCC GCAGCACCACTGACTGCGGGGGTCCCAAGGACCACCCCTTGACCTGTGA TGACCCCGCTTCCAGGACTCCTCTTCCTCAAAGGCCCCTCCCCCCAGC CTTCCAAGCCCATCCCGACTCCCGGGGCCCTCGGACACCCCGATCCTCC CACAATAAAGGCTTCTCAATCCGCA | 1 |
| Human Chorionic Gonadotropin Protein Sequence Length: 165 | MEMFQGLLLLLLLSMGGTWASKEPLRPRCRPINATLAVEKEGCPVCITV NTTICAGYCPTMTRVLQGVLPALPQvvCNYRDVRFESIRLPGCPRGVNP VVSYAVALSCQCALCRRSTTDCGGPKDHPLTCDDPRFQDSSSSKAPPPS LPSPSRLPGPSDTPILPQ | 2 |
| Human Chorionic Gonadotropin CTP-37 Sequence Length: 114 | ACCTGTGATGACCCCCGCTTCCAGGACTCCTCTTCCTCAAAGGCCCCTC CCCCCAGCCTTCCAAGCCCATCCCGACTCCCGGGGCCCTCGGACACCCC GATCCTCCCACAATAA | 3 |
| Human Chorionic Gonadotropin CTP-37 | TCDDPRFQDSSSSKAPPPSLPSPSRLPGPSDTPILPQ | 4 |
| Human Chorionic Gonadotropin CTP-39 | ACCAUGGGCACCUGCGACGACCCCAGAUUCCAGGACAGCAGCAGCAGCA AAGCCCCCCCCCCAGCCUGCCCAGCCCCAGCAGACUGCCCGGCCCCAG CGACACCCCCAUCCUGCCCAGUAA | 5 |
| Human Chorionic Gonadotropin CTP-39 Sequence Length: 39 | MGTCDDPRFQDSSSSKAPPPSLPSPSRLPGPSDTPILPQ | 6 |
| 5'-UTR based on HCV IRES Sequence Length: 327 | GCCAGCCCCCUGAUGGGGGCGACACUCCACCAUGAAUCACUCCCCCGGC GGGUCUACGUCUUCACGCAGAAAGCGCCUAGCCAUGGCGCUAGUAUGAG UGUCGUGCAGCCGCCGGGACCCCCCCUCCCGGGAGAGCCAUAGCGGUCU GCGGAACCGGUGCACCGGAAUGCCAGGACGACCGGGUCCUUUCUUGGAU CAACCCGCUCAAUGCCUGGAGAUUUGGGCGUGCCCCCGCAGACCGCAAG CCGUAGUGUUGGGUCGCGAAGGCCUUGUGGUACUGCCUGAUAGGGUGCU UGCGAGUGCCCCUUUAGGUCUCGUAGACCGUGC | 7 |
| 3'-UTR based on beta-globin Sequence Length: 131 | GCUCGCUUUCUUGCUGUCCAAUUUCUAUUAAAGGUCCUUUGUUCCCUAA GUCCAACUACUAAACUGAGGGAUAUUACAAAGGGCCUUGAGCAUCUGGA UUCUGCCUAAUAAAAAACAUUUAUUUUCAUUGC | 8 |
| Human Chorionic Gonadotropin CTP-39 (5'-UTR, ORF, 3'-UTR) Sequence Length: 581 | GCCAGCCCCCUGAUGGGGGCGACACUCCACCAUGAAUCACUCCCCCGGC GGGUCUACGUCUUCACGCAGAAAGCGCCUAGCCAUGGCGCUAGUAUGAG UGUCGUGCAGCCGCCGGGACCCCCCCUCCCGGGAGAGCCAUAGCGGUCU GCGGAACCGGUGCACCGGAAUGCCAGGACGACCGGGUCCUUUCUUGGAU CAACCCGCUCAAUGCCUGGAGAUUUGGGCGUGCCCCCGCAGACCGCAAG CCGUAGUGUUGGGUCGCGAAGGCCUUGUGGUACUGCCUGAUAGGGUGCU UGCGAGUGCCCCUUUAGGUCUCGUAGACCGUGCACCAUGGGCACCUGCG ACGACCCCAGAUUCCAGGACAGCAGCAGCAGCAAAGCCCCCCCCCCCAG CCUGCCCAGCCCCAGCAGACUGCCCGGCCCCAGCGACACCCCCAUCCUG CCCCAGUAAGCUCGCUUUCUUGCUGUCCAAUUUCUAUUAAAGGUCCUUU GUUCCCUAAGUCCAACUACUAAACUGAGGGAUAUUACAAAGGGCCUUGA GCAUCUGGAUUCUGCCUAAUAAAAAACAUUUAUUUUCAUUGC | 9 |
| Human Chorionic Gonadotropin CTP-39 dimer 5'-UTR, 2x ORF, 3'-UTR) Sequence Length: 701 | GCCAGCCCCCUGAUGGGGGCGACACUCCACCAUGAAUCACUCCCCCGGC GGGUCUACGUCUUCACGCAGAAAGCGCCUAGCCAUGGCGCUAGUAUGAG UGUCGUGCAGCCGCCGGGACCCCCCCUCCCGGGAGAGCCAUAGCGGUCU GCGGAACCGGUGCACCGGAAUGCCAGGACGACCGGGUCCUUUCUUGGAU CAACCCGCUCAAUGCCUGGAGAUUUGGGCGUGCCCCCGCAGACCGCAAG CCGUAGUGUUGGGUCGCGAAGGCCUUGUGGUACUGCCUGAUAGGGUGCU UGCGAGUGCCCCUUUAGGUCUCGUAGACCGUGCACCAUGGGCACCUGCG ACGACCCCAGAUUCCAGGACAGCAGCAGCAGCAAAGCCCCCCCCCCAG CCUGCCCAGCCCCAGCAGACUGCCCGGCCCCAGCGACACCCCCAUCCUG CCCCAGUAACCAUGGGCACCUGCGACGACCCCAGAUUCCAGGACAGCAGCA GCAGCAAAGCCCCCCCCCCCAGCCUGCCCAGCCCCAGCAGACUGCCCGG | 10 |

TABLE 4-continued

Sequences

| Description | Sequence (5'→3') | SEQ ID NO: |
|---|---|---|
| | CCCCAGCGACACCCCCAUCCUGCCCCAGUAAGCUCGCUUUCUUGCUGUC CAAUUUCUAUUAAAGGUCCUUUGUUCCCUAAGUCCAACUACUAAACUGA GGGAUAUUACAAAGGGCCUUGAGCAUCUGGAUUCUGCCUAAUAAAAAAC AUUUAUUUUCAUUGC | |
| Interleukin-10 exon 4 splice acceptor antisense (IL-10E4SA) Sequence Length: 21 | GGAGAAATCGATGCTGAAGAA | 11 |
| CTP21 Sequence Length: 21 | TCDDPRFQDSSSSKAPPPSLP | 12 |
| CTP 16 Sequence Length: 16 | SPSRLPGPSDDTPILPQ | 13 |

TABLE 5

Raw DNA for C-terminal peptide of hCG.

```
1                                             30
acc tgt gat gac ccc cgc ttc cag gac tcc
Thr Cys Asp Asp Pro Arg Phe Gln Asp Ser 31                                            60
tct tcc tca aag gcc cct ccc ccc agc ctt
Ser Ser Ser Lys Ala Pro Pro Pro Ser Leu 61                                            90
cca agc cca tcc cga ctc ccg ggg ccc tcg
Pro Ser Pro Ser Arg Leu Pro Gly Pro Ser 91                                           114
gac acc ccg atc ctc cca caa taa
Asp Thr Pro Ile Leu Pro Gln STOP
```

It will be apparent to one of ordinary skill in the relevant art that suitable modifications and adaptations to the compositions, formulations, methods, processes, apparata, assemblies, and applications described herein can be made without departing from the scope of any embodiments or aspects thereof. The compositions, apparata, assemblies, and methods provided are exemplary and are not intended to limit the scope of any of the disclosed embodiments. All the various embodiments, aspects, and options disclosed herein can be combined in any variations or iterations. The scope of the compositions, formulations, methods, apparata, assemblies, and processes described herein include all actual or potential combinations of embodiments, aspects, options, examples, and preferences described herein. The compositions, formulations, apparata, assemblies, or methods described herein may omit any component or step, substitute any component or step disclosed herein, or include any component or step disclosed elsewhere herein. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. All patents and publications cited herein are incorporated by reference herein for the specific teachings thereof.

REFERENCES

1. Acevedo et al., "Effects of immunization against human choriogonadotropin on the growth of transplanted Lewis lung carcinoma and spontaneous mammary adenocarcinoma in mice." Cancer Detect. Prev. Suppl. 1: 477-486 (1987).
2. Alfthan et al., "Elevation of free beta subunit of human choriogonadotropin and core beta fragment of human choriogonadotropin in the serum and urine of patients with malignant pancreatic and biliary disease," Cancer Res. 52 (17): 4628-4633 (1992).
3. Anderson et al., "Nucleoside modifications in RNA limit activation of 2'-5'-oligoadenylate synthetase and increase resistance to cleavage by RNase L," Nucleic Acids Res. 39 (21): 9329-9338 (2011).
4. Buckley and Fox, "An immunohistochemical study of the significance of HCG secretion by large bowel adenocarcinomata," J. Clin Pathol. 32(4): 368-372 (1979).
5. Campo et al., "Human chorionic gonadotropin in colorectal carcinoma. An immunohistochemical study," Cancer 59(9): 1611-1616 (1987).
6. Han, T. Human chorionic gonadotropin. Its inhibitory effect on cell-mediated immunity in vivo and in vitro," Immunology 29(3): 509-515 (1975).
7. Henderson et al., "Cap 1 Messenger RNA Synthesis with Co-transcriptional CleanCap® Analog by In Vitro Transcription," Curr. Protoc. 1(2): e39 (2021).
8. Iles et al., "Does hCG or hCGbeta play a role in cancer cell biology?" Mol. Cell. Endocrinol. 329(1-2): 62-70 (2010).
9. Iversen et al., "Monoclonal antibodies to two epitopes of beta-human chorionic gonadotropin for the treatment of cancer," Curr. Opin. Mol. Ther. 5(2):156-160 (2003).
10. Kellen et al., "Effects of antibodies to choriogonadotropin in malignant growth. II. Solid transplantable rat tumors," Cancer Immunol. Immunother. 13(1): 2-4 (1982).

11. Lamb "BNT162b2 mRNA COVID-19 Vaccine: First Approval," *Drugs* 81(4): 495-501 (2021).
12. Lapthorn et al., "Crystal structure of human chorionic gonadotropin," *Nature* 369(6480): 455-461 (1994).
13. The National Heart, Lung, and Blood Institute Acute Respiratory Distress Syndrome (ARDS) Clinical Trials Network, "Pulmonary-artery versus central venous catheter to guide treatment of acute lung injury," *N. Engl. J. Med.* 354(21): 2213-2224 (2006)
14. Panchal et al., "Induced IL-10 splice altering approach to antiviral drug discovery," *Nucleic Acid Ther.* 24(3): 179-185 (2014).
15. Richard, et al. "Early use of the pulmonary artery catheter and outcomes in patients with shock and acute respiratory distress syndrome: a randomized controlled trial," *J. Am. Med. Assoc.* 290(20): 2713-2720 (2003).
16. Skinner and Whitehead, "Tumor-associated antigens in polyps and carcinoma of the human large bowel," *Cancer* 47(6): 1241-1245 (1981).
17. Tumban, "Lead SARS-CoV-2 Candidate Vaccines: Expectations from Phase III Trials and Recommendations Post-Vaccine Approval," *Viruses* 13(1) 54: 10.3390/v13010054 (2020).
18. Walsh et al., "Safety and Immunogenicity of Two RNA-Based Covid-19 Vaccine Candidates," *N. Engl. J. Med.* 383(25): 2439-2450 (2020).

What is claimed is:

1. An mRNA vaccine composition comprising:
   an mRNA polynucleotide encoding SEQ ID NO: 4;
   a DNA polynucleotide comprising an antisense IL-10 splice acceptor exon 4 oligomer of SEQ ID NO: 11; and
   one or more pharmaceutically acceptable excipients in a solution suitable for injection.

2. The composition of claim 1, wherein the composition further comprises a polypeptide encoded by SEQ ID NO: 1.

3. The composition of claim 1, wherein the composition further comprises one or more monoclonal antibodies immunoreactive to a hCG-CTP21 peptide of SEQ ID NO:12 or a hCG-CTP16 peptide of SEQ ID NO: 13.

4. A method for treating a cancer in a subject in need thereof comprising: administering to the subject the mRNA vaccine composition of claim 1.

5. The method of claim 4, wherein the administration is repeated on a once per four-week schedule for a period of at least 12 to 16 weeks.

6. The method of claim 4, wherein the administration comprises administering a dose of 0.03 to 0.1 mg of the vaccine composition to the subject.

7. The method of claim 4, wherein the vaccine composition further comprises an mRNA encoding hCG-CTP37.

8. The method of claim 4, wherein the vaccine composition further comprises nanoparticle drug carriers, liposomes, viral vectors, or microbubbles.

9. The method of claim 4, wherein the vaccine composition is administered to a solid tumor using a micro catheter.

10. The method of claim 4, wherein the vaccine composition is incorporated into substance-eluting beads.

11. The method of claim 10, wherein the substance-eluting beads comprise biocompatible, resorbable, or non-resorbable hydrogel beads comprising one or more of: polyethylene glycol polymers; nanoparticle-containing hydrogels; cyclodextrin hydrogels; hydrophilic polymers, polyethylene glycol, poly lactic acid, poly ε-caprolactone, polypropylene oxide, poly D,L-lactide-co-glycolide, or poly ε-caprolactone-co-D,L-lactide; ultra-thermosensitive hydrogels; hydrogels, emulsions, vesicular micelles, liposomes, or nanocapsules; solid lipid microparticles or nanoparticles, nanostructured lipid carriers, or lipid drug conjugates; biocompatible hydrogels comprising poly(isopropylamide-co-n-butyl methacrylate and PEG; polyethylenimine based hydrogels; supramolecular hydrogels; DNA-hydrogels; multi-functional and stimuli-responsive hydrogels; n-acrylic polymers impregnated with porcine gelatin; or gelatin.

12. The method of claim 10, wherein the substance-eluting beads comprise soybean lecithin entrapping hydrophilic bone morphogenic protein-2 into nanoporous poly(lactide-co-glycolide)-based microspheres.

13. The method of claim 4, wherein the vaccine composition is delivered using an image guided percutaneous biopsy needle.

14. The method of claim 4, wherein the vaccine composition is delivered using a pressure-enabled micro catheter.

15. The method of claim 14, wherein the vaccine composition is delivered using a pressure-enabled micro catheter using a continuous flow.

16. The method of claim 14, wherein the vaccine composition is delivered using a pressure-enabled micro catheter using an automated pulsatile flow.

17. The method of claim 4, wherein the vaccine composition is delivered using biologic scaffolds.

18. The method of claim 4, wherein the vaccine composition is delivered using polymer scaffolds.

19. The method of claim 4, wherein the vaccine composition is delivered using biological and polymer reservoirs for sustained delivery.

\* \* \* \* \*

SEQUENCE LISTING

```
<160> NUMBER OF SEQ ID NOS: 13

<210> SEQ ID NO 1
<211> LENGTH: 515
<212> TYPE: DNA
<213> ORGANISM: Homo sapiens

<400> SEQUENCE: 1
atggagatgt tccaggggct gctgctgttg ctgctgctga gcatgggcgg gacatgggca      60
tccaaggagc cgcttcggcc acggtgccgc cccatcaatg ccaccctggc tgtggagaag     120
gagggctgcc ccgtgtgcat caccgtcaac accaccatct gtgccggcta ctgccccacc     180
atgacccgcg tgctgcaggg ggtcctgccg gccctgcctc aggtggtgtg caactaccgc     240
gatgtgcgct tcgagtccat ccggctccct ggctgcccgc gcggcgtgaa ccccgtggtc     300
tcctacgccg tggctctcag ctgtcaatgt gcactctgcc gccgcagcac cactgactgc     360
gggggtccca aggaccaccc cttgacctgt gatgaccccc gcttccagga ctcctcttcc     420
tcaaaggccc ctcccccccag ccttccaagc ccatcccgac tcccggggcc ctcggacacc    480
ccgatcctcc cacaataaag gcttctcaat ccgca                                515

<210> SEQ ID NO 2
<211> LENGTH: 165
<212> TYPE: PRT
<213> ORGANISM: Homo sapiens

<400> SEQUENCE: 2

Met Glu Met Phe Gln Gly Leu Leu Leu Leu Leu Leu Leu Ser Met Gly
1               5                   10                  15

Gly Thr Trp Ala Ser Lys Glu Pro Leu Arg Pro Arg Cys Arg Pro Ile
            20                  25                  30

Asn Ala Thr Leu Ala Val Glu Lys Glu Gly Cys Pro Val Cys Ile Thr
        35                  40                  45

Val Asn Thr Thr Ile Cys Ala Gly Tyr Cys Pro Thr Met Thr Arg Val
    50                  55                  60

Leu Gln Gly Val Leu Pro Ala Leu Pro Gln Val Val Cys Asn Tyr Arg
65                  70                  75                  80

Asp Val Arg Phe Glu Ser Ile Arg Leu Pro Gly Cys Pro Arg Gly Val
                85                  90                  95

Asn Pro Val Val Ser Tyr Ala Val Ala Leu Ser Cys Gln Cys Ala Leu
            100                 105                 110

Cys Arg Arg Ser Thr Thr Asp Cys Gly Gly Pro Lys Asp His Pro Leu
        115                 120                 125

Thr Cys Asp Asp Pro Arg Phe Gln Asp Ser Ser Ser Ser Lys Ala Pro
```

```
                130             135             140
Pro Pro Ser Leu Pro Ser Pro Ser Arg Leu Pro Gly Pro Ser Asp Thr
145                 150             155             160

Pro Ile Leu Pro Gln
            165

<210> SEQ ID NO 3
<211> LENGTH: 114
<212> TYPE: DNA
<213> ORGANISM: Homo sapiens

<400> SEQUENCE: 3
acctgtgatg accccgctt ccaggactcc tcttcctcaa aggccctcc ccccagcctt      60 ccaagcccat cccgactccc ggggccctcg acaccccga tcctcccaca ataa          114

<210> SEQ ID NO 4
<211> LENGTH: 37
<212> TYPE: PRT
<213> ORGANISM: Homo sapiens

<400> SEQUENCE: 4

Thr Cys Asp Asp Pro Arg Phe Gln Asp Ser Ser Ser Lys Ala Pro
1               5                   10                  15

Pro Pro Ser Leu Pro Ser Pro Ser Arg Leu Pro Gly Pro Ser Asp Thr
            20                  25                  30

Pro Ile Leu Pro Gln
        35

<210> SEQ ID NO 5
<211> LENGTH: 123
<212> TYPE: RNA
<213> ORGANISM: Homo sapiens

<400> SEQUENCE: 5
accaugggca ccugcgacga ccccagauuc caggacagca gcagcagcaa agccccccc     60 cccagccugc ccagccccag cagacugccc ggccccagcg acaccccau ccugcccag    120 uaa                                                                123

<210> SEQ ID NO 6
<211> LENGTH: 39
<212> TYPE: PRT
<213> ORGANISM: Homo sapiens

<400> SEQUENCE: 6

Met Gly Thr Cys Asp Asp Pro Arg Phe Gln Asp Ser Ser Ser Lys
1               5                   10                  15

Ala Pro Pro Pro Ser Leu Pro Ser Pro Ser Arg Leu Pro Gly Pro Ser
            20                  25                  30

Asp Thr Pro Ile Leu Pro Gln
            35

<210> SEQ ID NO 7
<211> LENGTH: 327
<212> TYPE: RNA
<213> ORGANISM: Homo sapiens

<400> SEQUENCE: 7
gccagccccc ugauggggc gacacuccac caugaaucac uccccggcg ggucuacguc     60 uucacgcaga aagcgccuag ccauggcgcu aguaugagug ucgugcagcc gccgggaccc   120
```

```
ccccucccgg gagagccaua gcggucugcg gaaccggugc accggaaugc caggacgacc    180
ggguccuuuc uuggaucaac ccgcucaaug ccuggagauu ugggcgugcc cccgcagacc    240
gcaagccgua guguuggguc gcgaaggccu ugugguacug ccugauaggg ugcuugcgag    300
ugccccuuua ggucucguag accgugc                                       327

<210> SEQ ID NO 8
<211> LENGTH: 131
<212> TYPE: RNA
<213> ORGANISM: Homo sapiens

<400> SEQUENCE: 8
gcucgcuuuc uugcugucca auuucuauua aagguccuuu guucccuaag uccaacuacu     60
aaacugaggg auauuacaaa gggccuugag caucuggauu cugccuaaua aaaacauuu    120 auuuucauug c                                                        131

<210> SEQ ID NO 9
<211> LENGTH: 581
<212> TYPE: RNA
<213> ORGANISM: Homo sapiens

<400> SEQUENCE: 9
gccagccccc ugauggggc gacacuccac caugaaucac uccccggcg ggucuacguc       60 uucacgcaga aagcgccuag ccauggcgcu aguaugagug ucgugcagcc gccgggaccc    120
ccccucccgg gagagccaua gcggucugcg gaaccggugc accggaaugc caggacgacc    180
ggguccuuuc uuggaucaac ccgcucaaug ccuggagauu ugggcgugcc cccgcagacc    240
gcaagccgua guguuggguc gcgaaggccu ugugguacug ccugauaggg ugcuugcgag    300
ugccccuuua ggucucguag accgugcacc augggcaccu gcgacgaccc cagauuccag    360
gacagcagca gcagcaaagc ccccccccc agccugccca gcccagcag acugcccggc     420 cccagcgaca ccccccauccu gccccaguaa gcucgcuuuc uugcugucca auuucuauua    480
aagguccuuu guucccuaag uccaacuacu aaacugaggg auauuacaaa gggccuugag    540
caucuggauu cugccuaaua aaaacauuu auuuucauug c                        581

<210> SEQ ID NO 10
<211> LENGTH: 701
<212> TYPE: RNA
<213> ORGANISM: Homo sapiens

<400> SEQUENCE: 10
gccagccccc ugauggggc gacacuccac caugaaucac uccccggcg ggucuacguc       60 uucacgcaga aagcgccuag ccauggcgcu aguaugagug ucgugcagcc gccgggaccc    120
ccccucccgg gagagccaua gcggucugcg gaaccggugc accggaaugc caggacgacc    180
ggguccuuuc uuggaucaac ccgcucaaug ccuggagauu ugggcgugcc cccgcagacc    240
gcaagccgua guguuggguc gcgaaggccu ugugguacug ccugauaggg ugcuugcgag    300
ugccccuuua ggucucguag accgugcacc augggcaccu gcgacgaccc cagauuccag    360
gacagcagca gcagcaaagc ccccccccc agccugccca gcccagcag acugcccggc     420 cccagcgaca ccccccauccu gccccagacc augggcaccu gcgacgaccc cagauuccag    480
gacagcagca gcagcaaagc ccccccccc agccugccca gcccagcag acugcccggc     540 cccagcgaca ccccccauccu gccccaguaa gcucgcuuuc uugcugucca auuucuauua    600
```

```
aagguccuuu guucccuaag uccaacuacu aaacugaggg auauuacaaa gggccuugag      660
caucuggauu cugccuaaua aaaaacauuu auuuucauug c                         701

<210> SEQ ID NO 11
<211> LENGTH: 21
<212> TYPE: DNA
<213> ORGANISM: Homo sapiens

<400> SEQUENCE: 11
ggagaaatcg atgctgaaga a                                                21

<210> SEQ ID NO 12
<211> LENGTH: 21
<212> TYPE: PRT
<213> ORGANISM: Homo sapiens

<400> SEQUENCE: 12

Thr Cys Asp Asp Pro Arg Phe Gln Asp Ser Ser Ser Ser Lys Ala Pro
1               5                   10                  15

Pro Pro Ser Leu Pro
            20

<210> SEQ ID NO 13
<211> LENGTH: 17
<212> TYPE: PRT
<213> ORGANISM: Homo sapiens

<400> SEQUENCE: 13

Ser Pro Ser Arg Leu Pro Gly Pro Ser Asp Asp Thr Pro Ile Leu Pro
1               5                   10                  15

Gln
```